United States Patent

[11] 3,610,574

[72] Inventor Thomas A. Hartman
 700 Capac Court, St. Louis, Mo. 63125
[21] Appl. No. 806,243
[22] Filed Mar. 11, 1969
[45] Patented Oct. 5, 1971

[54] FLEXIBLE STEM SLIDE VALVE
 12 Claims, 4 Drawing Figs.
[52] U.S. Cl. .................................................. 251/176,
 251/193, 251/326, 251/328
[51] Int. Cl. ...................................................... F16k 3/16
[50] Field of Search .......................................... 251/176,
 177, 179, 147, 193, 203, 204

[56] References Cited
UNITED STATES PATENTS

| | | | |
|---|---|---|---|
| 540,568 | 6/1895 | Abrahamson | 251/147 |
| 2,285,305 | 6/1942 | Reid | 251/147 X |
| 2,492,917 | 12/1949 | Courtot | 251/179 |
| 973,606 | 10/1910 | Worley | 251/176 X |
| 1,550,725 | 8/1925 | Jung | 251/176 |
| 1,969,092 | 8/1934 | Mussen | 251/176 X |
| 2,503,881 | 4/1950 | Manis | 251/176 X |
| 2,684,827 | 7/1954 | Hohnstein | 251/176 X |
| 2,777,462 | 1/1957 | Hohnstein | 251/176 X |
| 2,835,468 | 5/1958 | Sparks | 251/176 X |
| 3,056,574 | 10/1962 | Greenawalt | 251/176 X |

Primary Examiner—Clarence R. Gordon
Attorneys—Rogers, Ezell, Eilers & Robbins, Edmond C. Rogers, Estill E. Ezell, Ray Eilers, Glenn K. Robbins and John T. Rogers ABSTRACT: A valve construction including a valve seat defining a flow passage therethrough and a vale member movable transversely of the passage and disposed in sliding contact with one axial end face of the seat. The valve member is elongated in its direction of movement and includes a first imperforate end portion for closing the passage and a second end portion having an opening formed therethrough for registry with the passage. An actuating mechanism for shifting the valve member is provided and includes structure coacting with the valve member to apply a lateral force thereon urging the valve member toward the seat end face with which it is engaged with the center point of the application of the force applied to the valve member maintained in general registry with the passage throughout movement of the valve member.

PATENTED OCT 5 1971 3,610,574
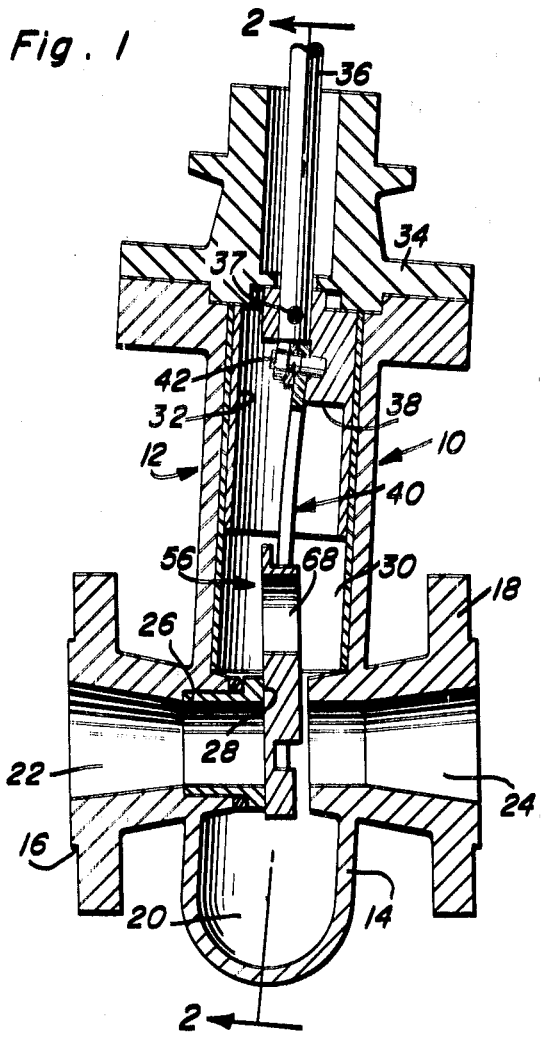
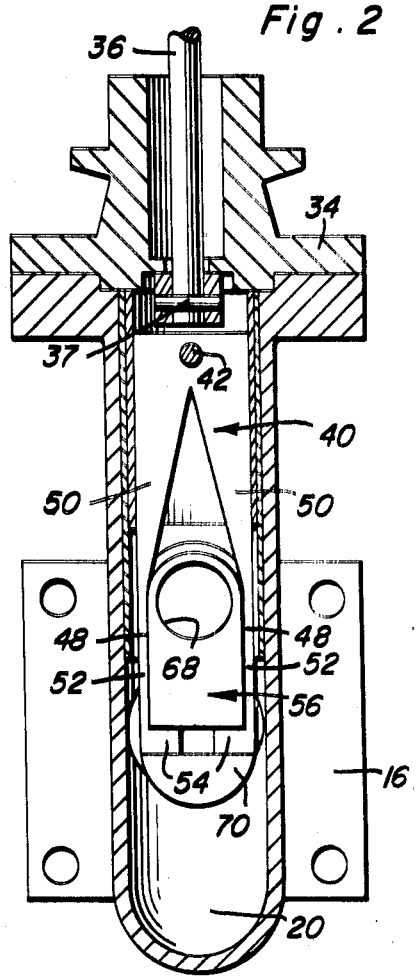
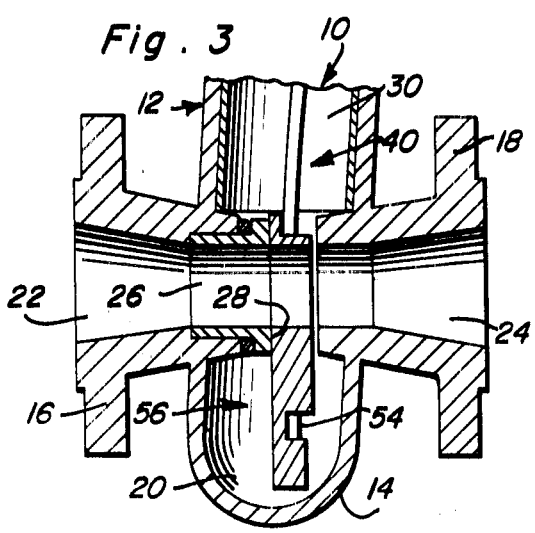
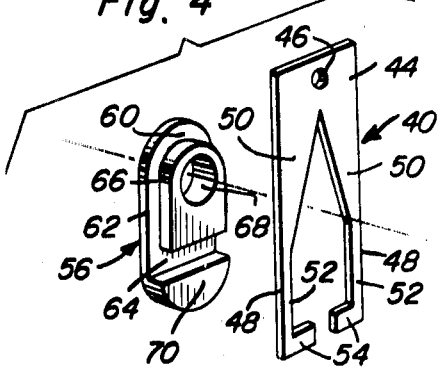
Thomas A. Hartman
INVENTOR

FLEXIBLE STEM SLIDE VALVE

This invention relates to a valve structure including a seating surface and a closure or valve member movable relative to the seating surface in sliding contact with the latter. A bearing-supported operator is provided for movement of the valve member between its opened and closed positions. An elongated spring has one end secured to the operator. The spring arm is slightly flexed and the other end thereof is attached to the valve member in a manner such that the spring arm applies a lateral force on the valve member urging it toward increased frictional contact with the seat surface of the valve engaged by the valve member. The connection of the spring arm to the valve member and the inclination of the seat surface relative to the path of movement of the valve operator is such that the central point or area of the application of lateral force on the valve member by the spring arm is maintained in substantially constant registry with the seat surface of the valve construction throughout movement of the valve member between its limit positions.

Various means may be utilized to shift the valve actuator and the spring arm forming the connection between the actuator and the valve member for shifting the latter between its limit positions. The connection between the spring arm and the valve member provides a means whereby the valve member is somewhat supported in a "floating" manner with the valve member in sliding contact with the seat surface. By this mode of actuation of the valve structure and control of movement of the valve member the valve member is substantially free of any stresses acting thereupon other than the lateral force applied thereto by the spring arm. Accordingly, substantially perfect mating of the valve member and seat sealing surfaces is maintained. Further, since this unique manner of mounting the valve member and maintaining the latter in engagement with the valve seat relieves the valve member of substantially all unpredictable stress forces, numerous combinations of compatible materials may be utilized in the construction of the valve seat and the valve member thereby adapting the entire value construction for use in diverse applications.

The valve structure may accordingly be used for controlling the flow of cryogenic fluids as well as to control the flow of hot metals in liquid state with it being only necessary to change the materials of which various components of the valve structure are constructed in order to adapt the valve construction to handle either cold or hot fluids.

In addition, the valve structure is constructed in a manner whereby line pressures may be utilized to assist in maintaining the valve member in its closed position and the flow-efficiency of the valve structure as to the passage of liquid therethrough when the valve member is in its open position approaches that of a common pipe section of comparable cross-sectional area. Further, the structure of the valve construction is such that it may be utilized in substantially any position.

The main object of this invention is to provide a valve construction having a high fluid flow-through efficiency and which will be capable, subject to various components of the valve being constructed of combinations of compatible materials, of handling either extremely cold fluids or extremely hot fluids.

Still another object of this invention is to provide a valve construction which will be capable of handling liquids as well as granular fluent materials.

A still further object of the invention is to provide a valve construction including structural and operational characteristics rendering it possible to accurately predict stress levels on the seat portion of the valve as well as the valve member portion of the valve to thus permit the use of specific materials such as ceramic and graphite materials in the construction of the seat and valve member portions of the valve construction.

A final object of this invention to be specifically enumerated herein is to provide a valve construction in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being has to he accompanying drawings forming a part hereof, wherein like numerals refer to like parts throughout, and in which:

FIG. 1 is a vertical sectional view taken substantially upon a plane passing through the center line of the valve construction:

FIG. 2 is a vertical sectional view taken substantially upon the plane indicated by section line 2—2 of FIG. 1;

FIG. 3 is a fragmentary vertical sectional view similar to the lower portion of FIG. 1 but with the valve member portion of the valve in an alternate position; and FIG. 4 is an exploded perspective view of the valve member portion of the valve construction and the actuator therefor.

Referring now more specifically to the drawings the numeral 10 generally designates the valve construction of the instant invention which may be seen to include a body referred to in general by the reference numeral 12. The body 12 includes a central portion 14 into which flow necks 16 and 18 open from opposite directions. The necks 16 and 18 may be either for flow into or out of central portion 14 of the body 12, but for the purpose of describing one embodiment of the valve construction the flow neck 16 will be considered the inlet neck and the flow neck 18 will be considered the outlet neck.

The central portion 14 defines a center cavity 20 and the inlet 16 defines an inlet passage 22 which opens into the cavity 20 while the outlet neck 18 defines an outlet passage 24 opening outwardly of the cavity 20.

The inner end of the flow neck 16 has a generally cylindrical valve seat 26 removably telescoped therein and the inner end face 28 of the valve seat 26 is annular and defines a seating surface which is generally planar.

The upper portion of the body 12 has a sleeve bearing 30 disposed therein and a cylindrical guide follower 32 is reciprocal in the sleeve bearing 30. The upper terminal end of the body 12 has a stuffing box housing 34 secured thereto in any convenient manner and an actuating rod 36 is reciprocal through the housing 34 and is attached to the guide follower 32 as at 37. In addition, the guide follower 32 includes a mounting boss 38 to which one end of a spring arm or beam referred to in general by the reference numeral 04 is secured by means of a suitable fastener 42.

As can best be seen from FIG. 2 and 4 of the drawings the spring arm of beam 40 includes a first end 44 which overlies the mounting boss 38 and has an aperture 46 formed therethrough for the reception of the fastener 42. The spring arm 40 defines a pair of legs 48 which are identical in configuration (except for being right and left handed) and which extend away from the first end 44 of the spring arm 40 and define the second end of the spring arm 40 at the free ends of the legs 48. The base ends of the legs 48 gradually taper away from the first end 44 as at 50 and include free end portions 52 which are substantially constant in cross-sectional area and which terminate outwardly in laterally directed terminal end portions 54 directed toward each other and spaced apart at their adjacent ends.

The valve construction 10 includes a valve member referred to in general by the reference numeral 56 and which includes relieved areas 60, 62 and 64 for receiving the tapering portions 50 of the legs 48, the constant cross-sectional end portion of the legs 48 and the terminal end portions 54 of the legs 48, respectively. The member 56 includes a first end portion 66 through which a flow port 68 is defined and a second end portion 70 which is imperforate.

From a comparison of FIGS. 1 and 3 of the drawings it may be seen that when the first end portion 66 is registered with the seat 26 a continuous flow passage is formed through the valve construction 10 and that when the second end portion 70 of the valve member 56 is registered with the valve seat 26, fluid flow through the valve construction is prevented.

The spring arm or beam 40 is constructed of resilient material and it will be observed that the plane in which the end face or seating surface 28 is disposed is inclined slightly relative to the longitudinal center axis of the sleeve bearing 30.

With the components of the valve construction 10 positioned as illustrated in FIG. 1 of the drawings, only the terminal end portions 54 and the adjacent ends of the constant cross-sectional end portions 52 of the legs 48 contact the relieved area 64 of the valve member 56. The spring arm or beam 40 is slightly flexed so as to be bowed and therefore applies a lateral force on the valve member 56 to urge it toward the left as viewed in FIG. 1 of the drawings into frictional sliding contact with the end face or valve seat 28. As the actuator rod 32 is lowered to close the valve, the valve member 56 slides downwardly along the end face 28 from the position thereof illustrated in FIG. 1 of the drawings toward the position thereof illustrated in FIG. 3. As this sliding movement occurs, the base end of the spring arm or beam 40 is further flexed and the end of the spring arm or beam 40 defined by the terminal end portions 54 and the adjacent ends of the constant cross-sectional end portions 52 of the legs 48 are substantially relaxed due to the inclination of the longitudinal center line of the sleeve bearing 30 relative to the plane of the face 28. This change in the areas of the support arm or beam 40 being flexed is caused by the tapering end portions 50 of the legs 48 and the adjacent ends of the constant cross-sectional area portions 52 of the legs 48 contacting the relieved areas 60 and 62 of the valve member 56. Thus, it may be appreciated that when the valve member 56 is in the open position illustrated in FIG. 1 of the drawings the central area of the lateral thrust applied to the valve member 56 in order to urge it into contact with the face 28 is disposed in general registry with the valve seat 26. However, as the valve member 56 is moved toward the closed position illustrated in FIG. 3 of the drawings, initial contact of the legs 48 with the valve member 56 is moved upwardly from the relieved area 64 to the relieved areas 60 and 62 and thus the central area of the application of lateral force applied to the valve member 56 by the spring arm 40 is also in general registry with the valve seat 26 when the valve member 56 is in the closed position and the central area of the application of lateral force on the valve member 56 is maintained in general registry with the valve sent 26 throughout movement of the valve member 56 between the open and closed positions illustrated in FIGS. 3 and 1, respectively.

Accordingly, while the valve member 56 is not pivotally supported from the free end of the spring arm or beam 40, its support therefrom is similar to that of a sliding pivotal connection because of the utilization of a resilient spring arm or beam and the relative inclination of the plane of the end face 28 and the center line of the sleeve bearing 32.

Inasmuch as the areas of contact of the legs 48 with the valve member 56 move upwardly along the legs 48 as the valve member 56 is shifted from the closed position illustrated in FIG. 1 of the drawings to the open position illustrated in FIG. 3 of the drawings, it will be appreciated that the spring arm or beam 40 applies a greater lateral thrust upon the valve member 56 when the valve member 56 is in the open position. Of course, the flow passage 68 formed through the valve member 56 could readily be shifted to the lower end of the valve member 56 in order that the valve construction would be open when the valve member 56 is raised and closed when the valve member 56 is lowered. Reversal of the end portion of the valve member 56 in which the flow passage 68 is formed may be desired depending upon whether the valve construction is to be utilized to control the flow of fluid under pressure or under vacuum. In any event, the central point of the area of the application of lateral forces on the valve member by the spring arm or beam 42 is maintained substantially registered with the valve seat 26 throughout movement of the valve member 56 from its open position to its closed position and the spring arm or beam 40 gradually varies the lateral forces applied thereby on the valve member 56 as the latter is shifted between its open and closed positions.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention.

What is claimed as new is as follows:

1. A valve construction including a valve seat defining a flow passage therethrough and a valve member shiftable transversely of the passage and disposed in sliding contact with one axial end face of the valve seat, said valve member including first and second portions for selective registry with the passage, and means operatively connected to said valve member operative to shift said valve member between positions with said first and second portions registered with said passage and to apply a force on said valve member urging the latter toward said end face of said valve seat with the center point of the application of said force on said valve member maintained generally aligned with the portion of said passage opening through said end face throughout shifting of said valve member between said positions.

2. The combination of claim 1 wherein said valve member is elongated and supported for longitudinal shifting relative to said seat.

3. The combination of claim 2 wherein said means includes, an elongated spring arm generally having one end guidingly supported for movement along a path generally paralleling the direction of movement of said valve member between said positions thereof, said spring arm being flexed and the other end of said spring arm being operatively connected to said valve member for longitudinal shifting of the latter in response to longitudinal shifting of said spring arm.

4. The combination of claim 3 wherein said end face is disposed generally in a plane slightly inclined relative to said path.

5. The combination of claim 4 wherein said other end of said arm is attached to said valve member in an area thereof comprising an imperforate end and overlies a surface of said valve member facing away from said end face and generally paralleling said plane, said arm, from said other end toward said one end, curving smoothly away from said surface and the point of initial contact of said arm with said surface gradually shifting toward said one end in response to shifting of said arm advancing said valve member toward a position with the imperforate end thereof registered with said passage.

6. The combination of claim 1 wherein said valve member includes an opening formed therethrough in one of said portions thereof.

7. The combination of claim 5 wherein said other end of said arm is bifurcated and the furcations thereof straddle an opening in one of said portions of said valve member and extend between said ends of said valve member.

8. The combination of claim 1 wherein said valve construction includes a valve body from which said seat is removably supported.

9. The combination of claim 8 wherein said valve seat comprises a tubular member removably telescoped within a bore formed in said body and seated against said body against movement in one axial direction, said one axial direction being the direction in which said force is applied on said valve member.

10. A valve closure comprising a movable closure member, an actuatable movable bearing-restrained deflected cantilevered beam operatively connected to the closure member for actuation thereof, and a seating surface, said closure member operating in sliding contact with the seating surface, the surface of sliding engagement of said closure member with said seating surface being at an operative angle to a bearing surface restraining said movable beam, the effective area of the operative connection between said beam and closure member automatically changing for exerting maximum effective force on said closure member as it moves from position to position.

11. The valve closure of claim 10 and including means for sliding said closure member over said seating surface between open and closed positions of the former during the latter's movement urging the latter toward said seating surface with he center point of the application of said force maintained generally aligned with substantially the flow section of said seating surface.

12. A valve closure comprising a movable closure member, an actuatable movable bearing-restrained deflected cantilevered beam operatively connected to the closure member for actuation thereof, a seating surface, said closure member operating in sliding contact with he seating surface, the surface of sliding engagement of said closure member with said seating surface being at on operative angle to a bearing surface restraining said movable beam, the effective area of the operative connection between said beam and closure member automatically changing for exerting maximum effective force on said closure member as it moves from position to position, means for sliding said closure member over said seating surface between open and closed positions of the former, said beam applying a force to said closure member.